Jan. 29, 1963   G. LAUBMEYER ETAL   3,075,486
CORED SOLDER
Filed June 25, 1959
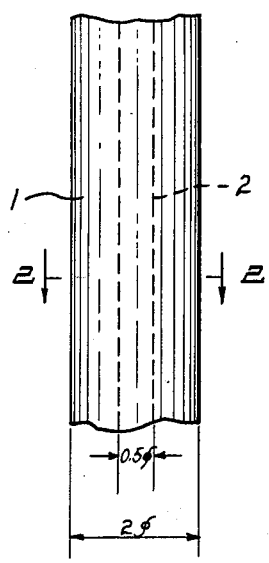
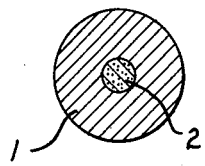
INVENTOR
GÜNTHER LAUBMEYER
MARIUS SMITS
BY  *Fritz G. Hochwald*
ATTORNEY

United States Patent Office 3,075,486
Patented Jan. 29, 1963

3,075,486
CORED SOLDER
Günther Laubmeyer and Marius Smits, both of 73 Bahnhofstrasse, Arolsen, Kreis Waldeck, Germany
Filed June 25, 1959, Ser. No. 822,970
Claims priority, application Germany June 25, 1958
2 Claims. (Cl. 113—110)

The invention relates to cored soft solders.

The use of solder has assumed increased importance for making electrical joints particularly in the electronics industry. While formerly soldering was used also for assembling certain parts of circuits, it is employed at present substantially only to join contacts in such a way that very small constant electric transition resistances are produced. For reasons of convenience and economy, the solder is employed more and more in the form of wire solder and recently generally as cored solder. Such cored solder is being employed in sizes of below 1 mm. up to any larger diameter. For electrical work, the cored solder is filled with a flux, generally rosin, to which may be added chemical substances for shortening the soldering operation; such fluxes are called activated rosin fluxes.

Rosin fluxes have the serious drawback that the rosin deposit around each joint scales off after a while and that the rosin scales, for instance when falling into telephone relays between the contacts, interrupt the current and may put a telephone installation wholly or in part out of operation. After the rosin film, particularly an "activated" rosin film, has scaled off, very obnoxious corrosion may take place by the air moisture between the metal and the rosin and around the joint. These drawbacks prevent frequently the use of strongly activated rosin for soft soldering because it may affect the electrical equipment. In this respect, particular problems arise in the miniature technique used more and more in electronics devices.

It is, therefore, a principal object of the invention to provide a rosin flux which avoids the recited drawbacks.

Other objects and advantages will be apparent from a consideration of the specification and claims.

Rosin cored solders have the form diagrammatically shown in the accompanying drawing in which FIG. 1 is a plan view of a cored solder, and FIG. 2 is a cross section along line II—II of FIG. 1.

In the drawings, the reference numeral 1 designates a hollow wire of a tin-lead alloy solder, and 2 is the rosin flux core.

According to the invention, there is admixed to the rosin a plasticizer of low vapor pressure and high boiling point in such low proportions adapted to the type and amount of activator that the solidification range of the rosin core is extended toward lower temperatures and that the flux solidifies after soldering around the joint in a quasi plastic and therefore non-tearing but tack-free state which protects against corrosion. Suitable plasticizers must have the following properties:

(a) A very low vapor pressure,
(b) A very high boiling point, preferably above the melting point of the solder,
(c) No chemical reactivity with the rosin,
(d) No chemical reactivity with the activators,
(e) If the plasticizer decomposes slightly at particularly high soldering temperatures, only such products must be formed which do not affect the soldering action of the rosin and the activators but are neutral or rather assist the soldering effect.

Such plasticizers are esters, for instance, esters of higher aliphatic alcohls with higher aliphatic carboxylic, preferably dicarboxylic acids. "Higher" aliphatic alcohols and acids are preferably saturated alcohols and acids having not more than 20 carbon atoms. Examples are butyl stearate, dibutyl or dioctyl sebacate, also butyl and octyl esters of phthalic acid, adipic acid, tartaric acid, and the like.

Also other known plasticizers, such as ketones, acid amides, alcohols, ether, and the like may be employed if they satisfy the conditions set forth hereinabove.

Said plasticizers extend the range of plastic solidification of the rosin towards lower temperatures. In other words, rosin containing such plasticizer flows better during soldering and covers a wide area around the soldered joint than conventional rosin flux, in form of a not scaling and not tearing film. Rosin activated with chlorides may evolve on solidification even at temperatures of 100 to 120° C. halogen vapors which may produce dangerous corrosions at the outer rim of the rosin area on the metals; in contrast thereto, a rosin-plasticizer composition according to the invention spreads even below a temperature of 90 to 110° C. over said corrosion zone and covers it with a kind of lacquer which prevents the access of air, so that no further corrosive action can take place. As said rosin-plasticizer composition has a considerably wider plastic solidification range towards lower temperatures, it remains quasi plastic even after soldering, without being tacky; it adheres to the soldered joint without cracks and does not scale off. In this way, the invention provides for a substantially corrosion-free soldering with fast acting activators, which are per se corrosive. Our novel solder eliminates essentially the need of applying a lacquer coating to the joint, as is frequently otherwise necessary to protect against corrosion.

In determining the required proportion of added plasticizer, it must be taken into account that the conventional activators generally lower themselves somewhat the freezing point of the rosin and thereby reduce its brittleness. The amount of plasticizer must therefore be adapted to the amount and type of activator present in the rosin.

While pure rosin, the natural volatile components of which have been removed by high temperature distillation, requires an addition of 12 percent of a highly effective plasticizer such as dioctyl sebacate, or up to 15 percent of less active plasticizers to obtain a quasi plastic but tack-free condition of the rosin, said proportion is reduced correspondingly for activated rosin containing chemical additives to speed up the soldering reaction.

For instance, if rosin activated with 8 percent of aniline hydrochloride is to be converted to a quasi plastic tack-free condition, an addition of about 2 to 4 percent of the plasticizers recited above is sufficient. If the aniline hydrochloride content is only 5 percent, the amount of plasticizer must be increased to about 5.7 percent.

If toluidine hydrochloride is used instead of aniline hydrochloride, the amount of plasticizer must be increased because toluidine hydrochloride reduces the brittleness of the resolidified rosin less than aniline hydrochloride.

Other activators suitable for the purpose of the invention are hydrochlorides of organic bases, for instance naphthalene hydrazine hydrochloride. All these compounds dissolve in molten rosin and evolve at temperatures of about 100° C. or higher in the rosin melt hydrochloric acid gas already at short duration of the soldering operation and at short heating to soldering temperature.

Similar effects are observed when dicarboxylic acids are used as activators. As the higher esters of said acids act as strong plasticizers, also the acids themselves have a plasticizing effect, though a weaker one. This is true of all dicarboxylic acids, be it aliphatic acids or acids having a phenyl or naphthalene nucleus. Particularly suitable are phthalic acid, malonic acid, succinic acid. The plasticizing effect of those compounds differs as a function of the specific compound, and it is therefore necessary to adjust the amount of plasticizer to the amount of specific activator in order to avoid tackiness of the resolidified rosin at the soldered joint.

The maximum allowable addition of plasticizer to activated rosin is readily determined by the conventional finger test where the resolidified rosin film after soldering must be tack-free when touched by a finger. The minimum amount is determined by the tear strength in sheet bend tests. The amount of plasticizer must be increased until samples of the rosin flux spread by a soldering iron on a thin sheet, show sufficient tear strength in a simple bending test. As the activators present in activated rosin change the freezing range as a function of their composition and amount, the correspondingly required additional amount of plasticizer will vary but can always be readily determined by the conventional tests recited hereinabove.

By way of example, a rosin cored solder according to the invention may be prepared as follows:

By the laboratory tests set forth hereinabove, the proportional amounts of activator and plasticizer to be added are determined. Rosin is molten with stirring by gentle heating until the homogenized melt has a temperature of 100 to 110° C. Then the determined amount of activator is slowly added while said temperature is maintained, with continued stirring, and dissolved. After a clear solution is obtained, the determined amount of plasticizer is added with vigorous stirring. Said melt is filled into the preheated container of an extrusion press for the manufacture of the cored solder. The container is closed and the press is put into operation, extruding the rosin cored solder.

If readily decomposable activators are used, the container is filled above the molten rosin with a gas under slight pressure, which gas corresponds preferably to the gas developed in the thermal decomposition of the activator. If such activator consists, for instance, of hydrochlorides which tend to develop gaseous hydrogen chloride on heating, the gas space of the container may be enriched with hydrogen chloride to reduce or prevent the decomposition rate of the activator at the extruding temperature. The extruded cored wire solder may then be reduced to the desired diameter in conventional drawing machines. It is also possible to fill larger unfilled tin tubes under gas pressure with the rosin melt and, after solidification of the melt, draw out the cored tube to the desired smaller diameter. These operations are well known in the art.

As an example, an activator may be used having the following composition: 33⅓ percent of succinic acid and 66⅔ percent of saturated dicarboxylic aliphatic acids having a higher carbon content than succinic acid. If five percent of such activator are added to the rosin, 8 percent of an efficient cold-resistant plasticizer such as dioctyl sebacate, calculated on the weight of the rosin, must be also added to attain a quasi plastic tack-free condition of the flux after soldering. If the amount of activator is reduced to about 2 percent of the rosin, 10 percent of the plasticizer must be used. In other words, if the activator content is increased, the plasticizer content must be correspondingly decreased, and vice versa.

Another suitable soldering flux composition consists of a rosin containing 2.5 percent of adipic acid as activator and 6.5 to 6.8 percent of dibutyl sebacate. If the amount of dibutyl sebacate is reduced below 6 percent, the plastifying effect is strongly reduced, whereas an amount of more than 7 percent of the plasticizer produces a rosin which is tacky, which has to be carefully avoided.

If a pure natural rosin is used, its turpentine oil content has to be taken into account. A rosin from which the turpentine oil is essentially distilled off, requires a larger amount of plasticizer than a rosin which contains still such oil which acts also as plasticizer.

Though we refer in the specification and claims only to rosin, it is to be understood that other natural or synthetic resinous materials consisting of, or containing, abietic acid may be used in the same manner.

We claim:

1. A cored solder comprising a tubular lead-tin alloy and a core, said core consisting of rosin, of 1 to 6 percent by weight of an activator selected from the group consisting of aniline hydrochloride, toluidine hydrochloride, phthalic acid, malonic acid, succinic acid, and adipic acid, and of 2 to 10 percent by weight of a dicarboxylic acid ester as a plasticizer, the higher percentages of plasticizer being used with the lower percentages of activator.

2. A cored solder as claimed in claim 1 containing about 2.5 percent by weight of adipic acid as activator and about 6.5 to 6.8 percent of dibutyl sebacate as plasticizer, calculated on the core composition.

References Cited in the file of this patent

UNITED STATES PATENTS

| | | |
|---|---|---|
| 2,052,740 | Barber et al. | Sept. 1, 1936 |
| 2,088,935 | Vaughn | Aug. 3, 1937 |
| 2,480,723 | Evans et al. | Aug. 30, 1949 |
| 2,563,391 | Browne | Aug. 7, 1951 |
| 2,833,030 | Peaslee | Sept. 19, 1952 |
| 2,845,700 | Bagno | Aug. 5, 1958 |
| 2,898,255 | Thompson et al. | Aug. 4, 1959 |